Dec. 24, 1940.　　F. J. BINGLEY　　2,226,459
SIGNAL DERIVING CIRCUIT
Original Filed Nov. 23, 1935
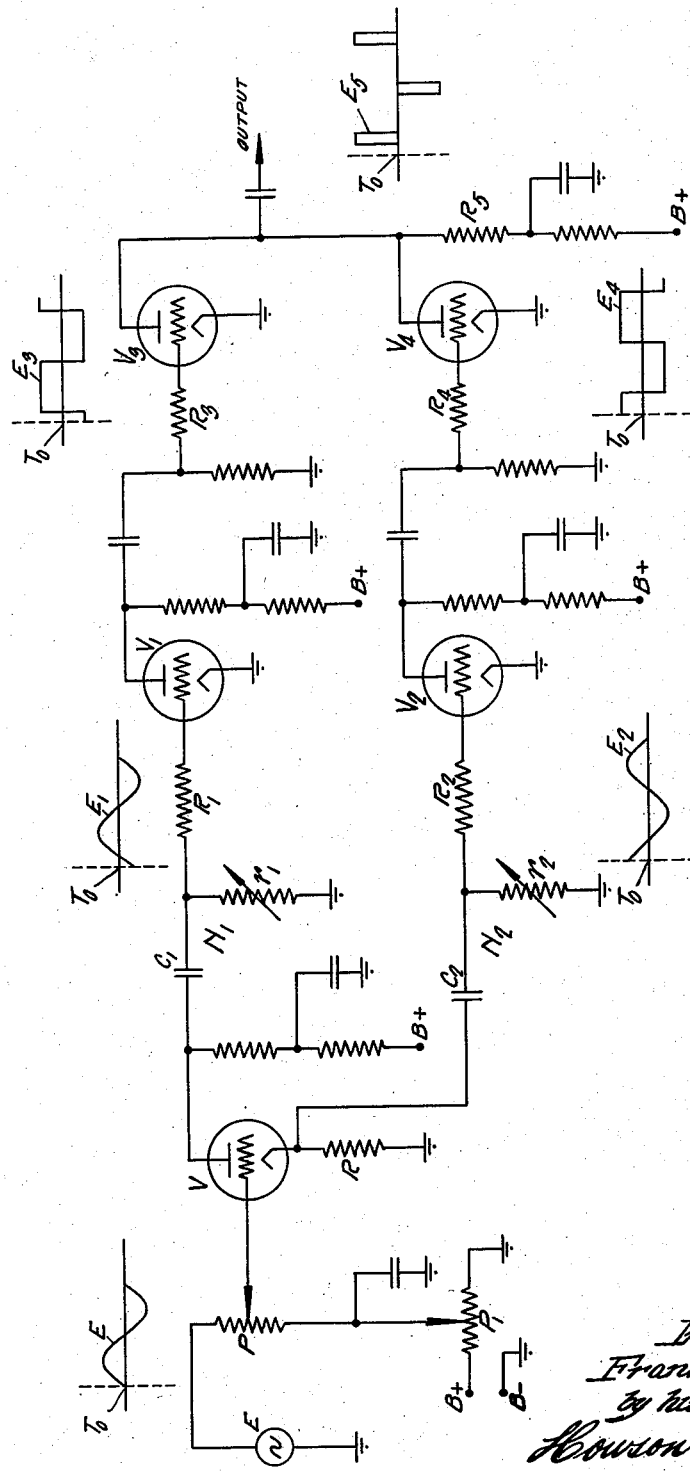

Patented Dec. 24, 1940

2,226,459

UNITED STATES PATENT OFFICE 2,226,459

SIGNAL-DERIVING CIRCUIT

Frank J. Bingley, Philadelphia, Pa., assignor, by mesne assignments, to Philco Radio and Television Corporation, Philadelphia, Pa., a corporation of Delaware Original application November 23, 1935, Serial No. 51,324, now Patent No. 2,171,536, dated September 5, 1939. Divided and this application July 5, 1939, Serial No. 282,933

12 Claims. (Cl. 250—36)

This invention relates to signal-deriving circuits and methods and, more particularly, to a novel circuit for deriving a plurality of signals from a single signal source. In a more limited aspect, the invention relates to a novel circuit for deriving a plurality of signals from a source of a wave signal, which derived signals may be combined to produce a desired resultant pulse signal.

The present application is a division of co-pending application, Serial No. 51,324, filed November 23, 1935, Patent No. 2,171,536, granted Sept. 5, 1939, wherein there is disclosed a complete television system, one of the features of which is the use of a narrow vertical synchronizing pulse signal. The present invention relates to a novel method and circuit disclosed in the said parent application, which is particularly adapted for the formation of the narrow vertical synchronizing pulse signal but which may be employed in any instance where it is desired to derive signals according to the method involved. It will be understood, therefore, that, while the present invention is particularly useful in a television system of the character disclosed in the said parent application, the invention is not limited to such use.

The principal object of the present invention is to provide a novel circuit and method for deriving a plurality of signals from a signal source and for utilizing said signals in a desired manner.

A more specific object of the invention is to provide a novel circuit and method of the stated character for operating upon and combining the derived signals to form a desired resultant signal.

Other objects and features of the invention will become apparent as the description proceeds.

The invention may be clearly understood by reference to the accompanying drawing, wherein the single figure is a diagrammatic illustration of a signal-deriving circuit constructed according to the principles of the invention.

Referring to the drawing, there is shown at E a source of wave signals which preferably comprises a suitable source of a sinusoidal signal having a predetermined frequency. In the system of the said parent application, the signal from this source is a sinusoidal signal having a frequency of 900 C. P. S., and it may be assumed that the source illustrated supplies such a signal, but it will be understood that the invention is not limited thereto. The signal E is shown diagrammatically and the signals derived in various parts of the circuit are shown in the same manner. These signal representations or illustrations will facilitate an understanding of the invention. In each instance, at least a complete cycle of the signal is shown with reference to the time axis, the time $T_0$ representing an arbitrary time reference. Since the relative time of occurrence of the several signals is very important, the time reference $T_0$ is essential to a clear understanding of the invention.

A variable portion of the signal E is supplied by means of potentiometer P to the grid of tube V. A source of anode supply voltage is connected between the anode and cathode of tube V, as illustrated. The anode circuit of this tube is coupled by a phase-shifting network $N_1$ to the grid of tube $V_1$. By means of the network $N_1$, which comprises a resistance $r_1$ and a condenser $C_1$, the phase of the output signal from the anode of tube V may be shifted to a desired extent, the purpose of which will be explained presently. The signal thus obtained is shown at $E_1$.

A second signal of opposite phase relation to the signal derived from the anode of tube V is obtained by providing a cathode load impedance R in the cathode lead of tube V, as illustrated. An output circuit is connected to this cathode load impedance and is coupled through a phase-shifting network $N_2$ to the grid of tube $V_2$. The network $N_2$ comprises a resistance $r_2$ and a condenser $c_2$ by means of which the phase of the signal taken from the cathode of tube V may be shifted. Since the tube V will act inherently as a phase-inverting device, as is well understood, the two signals derived from the tube, one from the anode and the other from the cathode, will be of opposite phase relation, and by means of the phase-shifting networks $N_1$ and $N_2$, the two derived signals may have their respective phases shifted relatively to obtain the phase-displaced signals $E_1$ and $E_2$, as illustrated. By proper adjustment of the phase-shifting networks, any desired displacement of the signals may be obtained. For optimum conditions the grid return of tube V should have a positive bias with respect to ground and this may be obtained from the potentiometer $P_1$.

Thus, the tube V and its two output circuits constitute a means for deriving signals of opposite phase and these may be employed with or without phase-displacement, or the phase-displaced signals may be operated upon and combined to produce a resultant signal by means of the apparatus now to be described.

The tubes $V_1$ and $V_2$ serve as wave-shaping devices and are caused to perform an initial flattening of the derived signals by virtue of the provision of grid resistors $R_1$ and $R_2$. When the input voltage to the grid of either of these tubes becomes positive with respect to its cathode, the grid will draw current and the resulting voltage drop in the associated grid resistor will act to flatten the top of the sinusoidal signal applied to the grid, thus partially forming a square wave. The other portion of the cycle of each signal is flattened by means of the subsequent tubes $V_3$ and $V_4$, respectively, and their associated grid resistors $R_3$ and $R_4$. Aside from the provision of these resistors, the coupling of the latter tubes to the former tubes comprises conventional resistance-capacitance coupling.

The signals which are thus obtained in the output circuits of tubes $V_3$ and $V_4$ are shown at $E_3$ and $E_4$. These signals are substantially symmetrical square wave signals, which, however, are displaced with respect to one another by virtue of the phase-shifting above mentioned. These signals are combined in the common load circuit of tubes $V_3$ and $V_4$ comprising the common load resistance $R_5$. It will be apparent that the two signals will cancel one another to a large extent, leaving a resultant signal $E_5$ which is taken from across the common load resistance by means of the output circuit illustrated. The signal $E_5$ may be utilized as described in detail in the above mentioned parent application to provide a narrow vertical synchronizing pulse signal in a television system of the character disclosed in the said application.

While the invention is particularly useful for this specific purpose, in a broad sense it comprises the derivation of a plurality of signals from a single source by means of the tube V and its associated output circuits. The signals thus derived may be utilized for any desired purpose, as previously mentioned.

Although the invention has been described with reference to a particular form of apparatus, it will be apparent that various other embodiments and modifications of the invention may be resorted to without departing from its scope.

I claim:

1. In a signal-deriving circuit, a source of signal, an electron discharge tube having at least a control grid, a cathode and an anode, means for applying the signal from said source between said control grid and said cathode, a source of anode supply voltage connected between said cathode and said anode, a cathode load impedance connected between said cathode and the low potential side of said anode supply source, an output circuit connected to said cathode load impedance for deriving an output signal therefrom, another output circuit connected to said anode for deriving a second output signal of opposite phase relation to said first signal, means for relatively varying the phase of said derived signals, means for modifying the wave shape of said signals, and means for combining said signals to produce a resultant pulse signal.

2. In a signal deriving circuit, a source of signal, an electron discharge tube having at least a control electrode, a cathode, and an anode, said tube having both anode and cathode loads, means for applying the signal from said source to said control electrode, means for deriving an anode signal from said anode load, means for deriving a cathode signal from said cathode load, said anode signal and said cathode signal being of opposite phase, means for relatively varying the phase of said derived signals, means for modifying the wave shape of said signals, and means for combining said signals to produce a resultant pulse signal.

3. In a signal deriving circuit, a source of signal, an electron discharge tube having at least a control electrode, a cathode, and an anode, said tube having both anode and cathode loads, means for applying the signal from said source to said control electrode, means for deriving an anode signal from said anode load, means for deriving a cathode signal from said cathode load, said anode signal being reversed with respect to said cathode signal, means associated with at least one of said loads for varying the phase of one of said derived signals with respect to the other, said last named means comprising at least a resistor and a capacitor, amplitude limiting means for modifying the shape of said signals, and means for combining said signals to produce a resultant pulse signal.

4. In a signal deriving circuit, a source of input signal of generally sine wave shape, an electron discharge tube having a grid, a cathode and an anode, said tube being provided with an anode load and a cathode load, means for applying said input signal to said grid, coupling means for deriving an anode signal from said anode load, additional coupling means for deriving a cathode signal from said cathode load, said anode and cathode signals being of opposite phase, phase shifting networks associated with at least one of said coupling means for varying the phase of one of said derived signals with respect to the other, amplitude limiting means for imparting a substantially square wave form to said derived signals, and signal combining means comprising a plurality of vacuum tubes having a common load circuit for combining the square wave signals to produce a narrow pulse signal.

5. In a signal deriving circuit, a source of input signals of generally sine wave shape, means including electronic phase inverting circuits for deriving from said input signal a pair of signals of opposite phase, phase shifting circuits for slightly varying the phase of one of said derived signals with respect to the other, amplitude limiting means for imparting a substantially square wave form to said derived signals, and signal combining means comprising a plurality of vacuum tubes having a common load circuit for combining said square wave signals to produce a narrow pulse signal.

6. In a signal deriving circuit, means for forming a pair of signals of similar wave shape but of opposite phase or polarity, phase shifting circuits for varying the phase of one of said signals with respect to the other, electronic amplitude limiting means for imparting a substantially square wave form to said signals, and signal combining means comprising a plurality of electron discharge devices having a common load circuit for combining said square waves to produce a relatively narrow pulse signal.

7. In a signal deriving circuit, means for forming a pair of signals of identical frequency, of substantially sine wave shape, but of opposite phase or polarity, phase shifting means comprising at least a resistor and a capacitor for slightly varying the relative phases of said signals, electronic amplitude limiting means for imparting a substantially square wave form to said signals, and signal combining means comprising a plurality of electron discharge devices having a common load circuit for combining said square waves to produce a relatively narrow pulse signal.

8. In an electrical signal deriving system including an electron discharge tube to which a signal is supplied, the method of forming a desired pulse signal, which comprises deriving a wave signal from said tube, deriving a second wave signal from said tube of opposite phase relation to said first derived wave signal, varying relatively the phase relation of said derived signals, and combining said derived signals to obtain a resultant signal.

9. In an electrical signal deriving system including an electron discharge tube to which a signal is supplied, the method of forming a desired pulse signal, which comprises deriving a wave signal from said tube, deriving a second wave signal from said tube of opposite phase relation to said first derived signal, varying relatively the phase relation of said derived signals, modifying the wave shape of said derived signals, and combining said modified signals to obtain a resultant signal.

10. In an electrical signal deriving system including a phase inverting device for supplying sine wave signals of opposite phase, the method of forming desired pulse signals, which comprises deriving a first wave signal from said device, deriving a second wave signal from said device of opposite phase relation to said first wave signal, varying relatively the phase relation of said derived signals, and combining only selected portions of said derived signals to obtain a resultant signal.

11. In a signal deriving circuit, means for forming a pair of signals of identical frequency, of substantially sine wave shape, but of opposite phase or polarity, phase shifting means comprising at least a resistor and a capacitor for slightly varying the relative phases of said signals, and a non-linear amplitude-responsive signal combining means having a common load circuit for combining said signals to produce a relatively narrow pulse signal.

12. In a signal deriving circuit, a first source of signals, said signals having a certain frequency and a substantially sine wave form, a second source of signals, said last-named signals being of similar frequency and wave form, but of opposite polarity, means for shifting the relative phases of said signals by an amount substantially less than 180 electrical degrees, whereby said signals appear with like polarity for short periods of time each cycle, and a signal combining network having a non-linear output-versus-input characteristic for forming relatively narrow impulse signals, said impulse signals being formed substantially only when said signals are of like polarity.

FRANK J. BINGLEY.